175-53
10/21/86 RE 32,267

United States Patent [19]
Cherrington

[11] E Patent Number: Re. 32,267
[45] Reissued Date of Patent: Oct. 21, 1986

[54] PROCESS FOR DRILLING UNDERGROUND ARCUATE PATHS AND INSTALLING PRODUCTION CASINGS, CONDUITS, OR FLOW PIPES THEREIN

[75] Inventor: Martin D. Cherrington, Fair Oaks, Calif.

[73] Assignee: Reading & Bates Construction Co., Tulsa, Okla.

[21] Appl. No.: 598,189

[22] Filed: Apr. 9, 1984

Related U.S. Patent Documents

Reissue of:
[64] Patent No.: 4,319,648
Issued: Mar. 16, 1982
Appl. No.: 77,960
Filed: Sep. 24, 1979

[51] Int. Cl.[4] ..... E21B 7/06; E21B 10/26
[52] U.S. Cl. ..... 175/53; 175/61; 175/65; 175/73; 175/386; 175/391; 405/184
[58] Field of Search ..... 175/53, 61, 62, 65, 175/386, 391; 405/184

[56] References Cited

U.S. PATENT DOCUMENTS

| | | | |
|---|---|---|---|
| 1,045,954 | 12/1912 | Decker . | |
| 1,890,022 | 12/1932 | Santiago . | |
| 2,204,844 | 6/1940 | Chappell | 175/386 X |
| 2,234,451 | 3/1941 | Ransome . | |
| 2,349,033 | 5/1944 | Elliott | 175/73 X |
| 2,558,341 | 6/1951 | Cory et al. . | |
| 3,072,205 | 1/1963 | Govin . | |
| 3,132,701 | 5/1964 | Juntunen | 405/184 X |
| 3,369,617 | 2/1968 | Brack et al. | 175/62 |
| 3,589,135 | 6/1971 | Ede | 405/184 |
| 3,840,079 | 10/1974 | Williamson | 175/62 X |
| 3,845,828 | 11/1974 | Taylor et al. | 175/73 |
| 3,878,903 | 4/1975 | Cherrington | 175/45 |
| 3,894,402 | 7/1975 | Cherrington | 175/53 X |
| 3,967,689 | 7/1976 | Cherrington | 175/391 |
| 3,996,758 | 12/1976 | Cherrington | 175/61 X |
| 4,003,440 | 1/1977 | Cherrington | 175/61 |
| 4,024,721 | 5/1977 | Takada et al. | 405/184 |
| 4,043,136 | 8/1977 | Cherrington | 175/53 X |
| 4,051,911 | 10/1977 | Cherrington | 175/107 |
| 4,078,617 | 3/1978 | Cherrington | 173/1 |
| 4,091,631 | 5/1978 | Cherrington | 175/62 X |
| 4,117,895 | 10/1978 | Ward et al. | 405/184 X |
| 4,121,673 | 10/1978 | Cherrington | 175/61 |
| 4,135,586 | 1/1979 | Cherrington | 173/147 |

FOREIGN PATENT DOCUMENTS

| | | |
|---|---|---|
| 166677 | 1/1956 | Australia . |
| 852620 | 9/1970 | Canada . |
| 1005433 | 2/1977 | Canada . |
| 1600083 | 7/1970 | France . |
| 54-63508 | 5/1979 | Japan . |

OTHER PUBLICATIONS

*Pipeline Digest*, "Big Advance is Made in Drilled Crossing", vol. XV, No. 18, Sep. 18, 1978, pp. 8 & 9.
U.S. Dept. of the Interior, Bureau of Mines Circular 8392, "Horizontal Boring Technology: A State-of-the Art Study", pp. 37 and 54.

*Primary Examiner*—Stephen J. Novosad
*Attorney, Agent, or Firm*—Allegretti, Newitt, Witcoff & McAndrews, Ltd.

[57] ABSTRACT

A directional drill attached to a drill string having periodic concentric collars is advanced in an inverted arcuate path to form a pilot hole underneath an obstacle followed by a larger concentric washover pipe. When the washover pipe reaches the surface on the other side of the obstacle a first reamer is attached to the end of the washover pipe exiting the drilling path, a second reamer of smaller diameter than the first reamer is attached to the other end of the first reamer by means providing for some separation between the two reamers, and a production casing of smaller diameter than the second reamer is attached to the other end of the second reamer with a swivel. The remaining length of the first portion of casing is supported some distance above the ground on rollers located above and beyond the exit point of the pilot hole. The reamers are operated by rotating the washover pipe and simultaneously drawing the washover pipe through the pilot hole. As the reamers are drawn through the pilot hole the first reamer enlarges the hole to a diameter greater than that of the casing. Drilling mud pumped through the washover pipe exits at the reamers to entrain the dislodged earth and the second reamer compacts it to form a bushing around the sides of the enlarged hole to lubricate the passage of the casing. The reaming operation may be performed without the production casing attached to the reamers followed by a second reaming operation with the casing attached in order to complete the installation.

30 Claims, 9 Drawing Figures

PROCESS FOR DRILLING UNDERGROUND ARCUATE PATHS AND INSTALLING PRODUCTION CASINGS, CONDUITS, OR FLOW PIPES THEREIN

Matter enclosed in heavy brackets [ ] appears in the original patent but forms no part of this reissue specification; matter printed in italics indicates the additions made by reissue.

BACKGROUND OF THE INVENTION

The present invention relates to a method for drilling underground inverted arcuate paths and installing production casings, conduits, or flow pipes therein.

Techniques have recently been developed for installing production casings, conduit, or flow pipes beneath rivers and other surface obstacles without dredging the riverbed, digging a trench, or otherwise altering the obstacle. See, e.g. U.S. Pat. No. 3,878,903. Instead a pilot hole is first drilled from a position at or near the surface on one side of the obstacle to a position at or near ground level on the other side. As the pilot hole is being drilled a washover pipe of inside diameter larger than the outside diameter of the drill string is advanced behind the leading end of the drill string and surrounding it. See U.S. Pat. No. 4,003,440. Reaming apparatus is then pushed or drawn through the pilot hole to enlarge the hole to a larger diameter. The production casing is thrust into the hole immediately behind the reaming apparatus and follows it along the drilling path. See U.S. Pat. Nos. 3,894,402; 4,043,136 and 4,091,631.

Prior methods of drilling the pilot hole have utilized sections of drill string which are of uniform external diameter. When joined together such sections produce a drill string of uniform external diameter having no external protrusions at the joints between the sections or elsewhere along the string. Such joints are relatively weak, and the entire drill string tends to frequently stick during the drilling of the pilot hole.

Existing methods of advancing the washover pipe around the drill string, such as that disclosed in U.S. Pat. No. 4,003,440, provide the leading end of the washover pipe with a cutting edge which enlarges the pilot hole to a diameter equal to that of the washover pipe. Since no provision is made for supplying drilling mud to the leading end of the advancing washover pipe to entrain the cuttings dislodged by the cutting edge, the cuttings accumulate at the leading end of the washover pipe and inhibit its advance.

Prior methods of reaming the pilot hole and installing the production casing have used a single reamer and required that powered means be provided to thrust the production casing into the hole. Prior attempts to draw the reaming apparatus or production casing through the hole with, for example, the drill string used in drilling the pilot hole, have resulted in the drill string knifing through the soil and the reaming apparatus or production casing not following the original drilling path. In these methods it is also necessary to frequently interrupt the installation process in order to join additional sections of the production casing to the trailing end of the casing.

SUMMARY OF THE INVENTION

The present invention provides apparatus and a method for installing production casings, conduits, flow pipes and the like underneath and spanning an obstacle such as a river. As in existing methods a directional drill attached to a drill string is advanced in an inverted arcuate path to form a pilot hole underneath the obstacle. A larger concentric washover pipe follows the advance of the drill at some distance behind the drill to form a concentric annulus about the drill string and enlarge the pilot hole.

The preferred drill string of the present invention is made up of sections having external upsets at each end, making each drill string section of slightly larger external diameter at each end than in the middle. When these sections are joined together a drill string is produced with integral concentric collars formed by the upsets at each joint between the sections. This produces a stronger connection at each joint and during the drilling of the pilot hole the collars help size the hole and prevent the drill string from sticking in the hole as frequently as in prior methods.

The leading end of the washover pipe is provided with cutting blades which enlarge the pilot hole to a diameter greater than that of the washover pipe. This produces an annulus between the enlarged pilot hole and the washover pipe. During the advance of the washover pipe drilling mud is supplied through the inner annulus between the washover pipe and the drill string to entrain the cuttings dislodged by the cutting blades and return them through the outer annulus between the enlarged pilot hole and the washover pipe. This prevents the cuttings from accumulating within the washover pipe at its leading end and inhibiting its advance.

In one embodiment of the invention, when both the drill string and the washover pipe reach the surface on the other side of the obstacle, a first reamer, preferably a flycutter reamer, of larger diameter than the production casing is attached to the end of the washover pipe where it exits the drilling path; a second reamer, preferably a floating reamer, having a relatively smaller leading end and a larger trailing end of smaller diameter than the first reamer and larger diameter than the casing is attached to the other end of the flycutter reamer by means, such as a section of washover pipe, providing for some separation between the two reamers; and the production casing is attached to the other end of the second reamer with a swivel. The end of the casing attached to the swivel is closed to prevent the entry of mud and cuttings during the reaming and installation operation. Preferably the casing joints have been previously welded together into a casing portion and the joints inspected and coated for corrosion resistance, so that the casing is in only one, or no more than a few, portions. This allows the casing to be installed in an almost continuous movement. The portions of the production casing may be supported in line with the pilot hole some distance above the ground on rollers placed beyond the exit point of the pilot hole.

During the reaming of the pilot hole and installation of the production casing the exit point of the pilot string may become the entry point of the reaming apparatus and production casing. The reaming apparatus is rotated, and drawn through the pilot hole, typically by the washover pipe, followed by the non-rotating production casing. As in existing methods, drilling mud is provided to exit at the first reamer and entrain the cuttings. Unlike existing methods, two reamers are used and drilling mud may additionally exit at the second reamer.

The mud supply system of the present invention is capable of supplying much more mud at a higher pressure than the supply systems of existing methods. This provides lubrication for the passage of the production casing and permits the reamers and production casing to be drawn through the hole without having the washover pipe knife into the soil and cause the reamers and production casing to leave the original drilling path.

As the reaming apparatus is drawn through the pilot hole the first reamer enlarges the hole to a diameter greater than that of the second reamer and the cuttings dislodged by the first reamer are entrained in the drilling mud. This separation provided between the first reamer and the second reamer which follows it permits the cuttings to separate within the drilling mud and produces a more accurate hole than other methods.

The smaller diameter second reamer forces the drilling mud and entrained cuttings into the annulus between itself and the sides of the enlarged hole to form a concentric ring of mud and cuttings around the interior of the enlarged hole while leaving a concentric opening within this ring for passage of the production casing. The ring of drilling mud and entrained cuttings acts as a bushing in the concentric annulus between the production casing and the hole to lubricate the advance of the even smaller diameter production casing. Since the leading end of the casing is closed, the mud and cuttings do not enter the casing.

As the non-rotating production casing is drawn along the drilling path behind the rotating reaming apparatus, the remaining length of the first portion of the production casing outside of the hole is drawn along the rollers supporting it towards the point where the casing enters the hole. That part of the casing which is between rollers advances toward the hole horizontally, and that part of the casing which is between the rollers nearest the hole and the entry point of the hole bends due to gravity towards the entry point, advancing at a downward angle and entering the hole. The weight of this downward-angled part of the casing helps crowd the casing into the hole and reduces the force required to draw the reaming apparatus and following casing through the hole.

Using the weight of part of the production casing to crowd the casing into the hole eliminates the need for powered means to thrust the casing into the hole behind the reamer as in existing methods. Furthermore, since the advancing casing is permitted to bend from its horizontal path along the rollers to its angle of entry into the hole over the entire distance from the rollers nearest the entry point to the entry point itself, the shear stress on the casing and the risk of casing failure are much less than they are when the casing is placed on the ground immediately in front of the hole and must bend into the hole over a relatively short distance.

This method of the present invention also permits joints of the production casing to be joined together into longer portions prior to the beginning of the reaming and casing installation process. This eliminates the need in existing methods to frequently interrupt the installation of the casing in order to join additional joints to the trailing end of the casing extending out of the entry point.

In an alternative embodiment of the invention the reaming operation may be performed without the production casing attached to the reaming apparatus, followed by a second reaming operation with the production casing attached in order to complete the installation. In this embodiment, in the first reaming operation washover pipe is attached to the trailing end of the second reamer to provide a means for drawing the reaming apparatus and production casing through the enlarged hole in the second reaming operation. In the second reaming operation the production casing is attached to the trailing end of the second reamer as before and the reaming and installation process proceeds as described above.

The novel features of the present invention, as well as further objects and advantages thereof, will be better understood from the following description and accompanying drawings in which preferred embodiments of the invention are illustrated by way of example. It is to be expressly understood, however, that the description and drawings are only for the purpose of illustration and as an aid to understanding, and are not intended as a definition of the limits of the invention.

DESCRIPTION OF THE PREFERRED EMBODIMENTS

Figure 1:
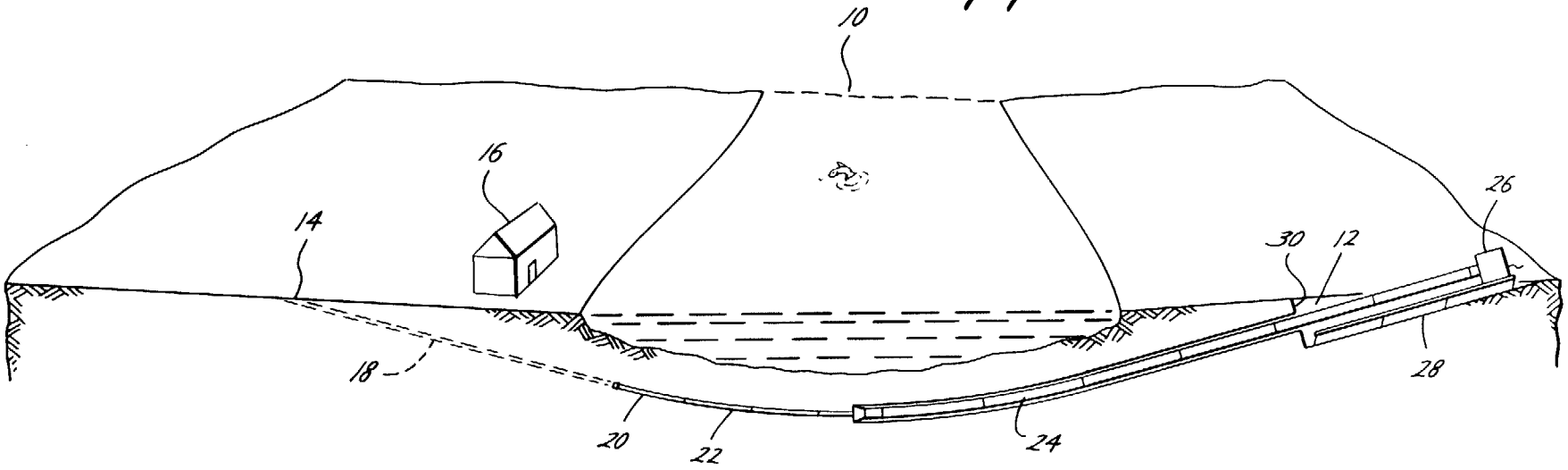
FIG. 1 is a cross-sectional elevation view illustrating the operation of the present invention in drilling a pilot hole along an underground inverted arcuate path under an obstacle.

The first operation of the present invention is illustrated generally in FIG. 1. In the situation depicted in FIG. 1, it is desired to traverse a water course 10, drilling from a first position 12 on the surface of the ground at one side of the water course to a second position 14 beyond a structure 16 at the other side. The desired path is illustrated generally by dashed line 18, and can comprise either a constant radius arc or a path of complex curvature. A pilot hole is drilled along path 18 by a directional drill 20 powered by mud pumped through a trailing drill string 22 which extends through the drilled hole and exists at position 12. Directional drill 20 can be controlled according to the principles set forth in U.S. Pat. No. 3,878,903 for "Apparatus and Process for Drilling Underground Arcuate Paths." Other directional drilling techniques could be used as well.

Washover pipe 24 extends from a position substantially behind directional drill 20 to the entrance 12 to the drilled hole. Washover pipe 24 is of larger diameter than drill string 22 so that the washover pipe will fit circumferentially around the drill string within the hole. Washover pipe 24 is typically made of ordinary 5" or larger diameter drill pipe. During the drilling along arcuate path 18, a survey tool, of a type well known in the art, is periodically inserted within drill string 22 to a position immediately behind directional drill 20 to determine the current position of the directional drill. This survey tool utilizes magnetic compasses to obtain such readings, and it is necessary for washover pipe 24 to trail directional drill 20 at a sufficient distance, typically at least 100 feet, so that it will not interfere with the operation of the survey tool, usually by drilling the pilot hole for some distance before beginning to insert the washover pipe. Typically washover pipe 24 is not advanced until drill string 22 begins to stick in the hole. Drill string 22 is advanced a desired distance, or until it begins to stick, the advance of drill string 22 is halted while washover pipe 24 is advanced around drill string 22, the leading end of washover pipe 24 remaining some distance behind the leading end of drill string 22 at all times, then the advance of washover pipe 24 is halted while drill string 22 is again advanced until it begins to stick.

At the entrance position 12 of the drilled hole into the ground, an inclined drill rig 26 is positioned in a slanted hole 28. The forward surface 30 of hole 28 is normal to the initial direction of the path into the ground for ease in drilling the hole.

Figure 1A:
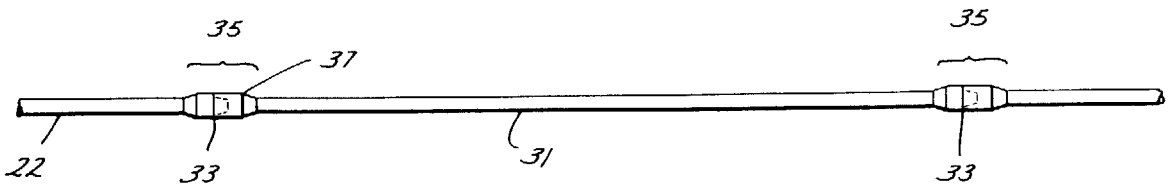
FIG. 1A is an enlarged elevation view of a portion of the drill string illustrated in FIG. 1.

A portion of drill string 22 is illustrated in more detail in FIG. 1A. Each section, such as that numbered 31, of drill string 22 has an upset 37 at each end, making each drill string section of slightly larger, e.g. about ⅜", external diameter at each end than in the middle. When these sections are joined together drill string 22 is produced with an integral concentric collar 35 at each joint 33 between the sections. This produces a stronger connection at each joint 33 and during the drilling of the pilot hole collars 35 help size the hole and prevent drill string 22 from sticking as frequently.

Figure 2:
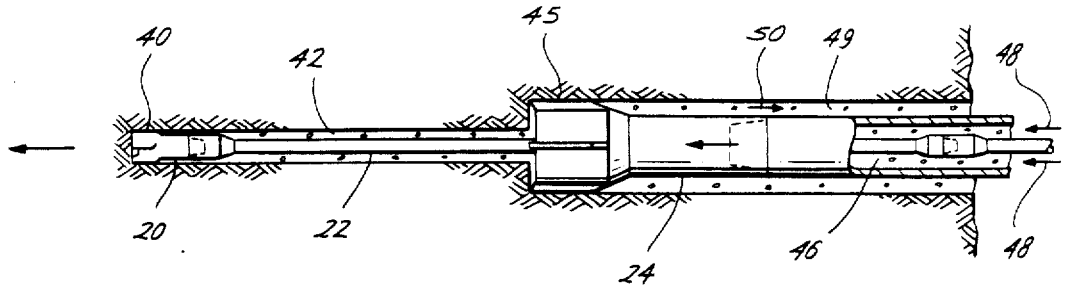
FIG. 2 is an elevation view of the leading end of the drilling apparatus illustrated in FIG. 1.

The leading end of the drilling apparatus illustrated in FIG. 1 is shown in more detail in FIG. 2. Directional drill 20 has a leading drill bit 40 powered by drilling mud supplied through drill string 22. As drill bit 40 dislodges the earth along the desired arcuate path, these cuttings are entrained in the drilling mud which flows backwardly in the small annular space 42 surrounding drill string 22 and into and through annulus 46 between drill string 22 and washover pipe 24.

The leading end of washover pipe 24 is enlarged and provided with cutting blades 45 which enlarge the pilot hole to a diameter greater than that of the washover pipe. For example, if washover pipe 24 is of 5" diameter, cutting blades 45 may enlarge the pilot hole to a 7½" diameter. This produces outer annulus 49 between the enlarged pilot hole and washover pipe 24. During the advance of washover pipe 24 drilling mud is supplied through inner annulus 46 between drill string 22 and washover pipe 24 as shown by arrows 48. The drilling mud entrains the cuttings dislodged by cutting blades 45 and returns them through outer annulus 49 as shown by arrow 50. This prevents the cuttings from accumulating at the leading end of washover pipe 24 and inhibiting its advance.

Figure 2A:
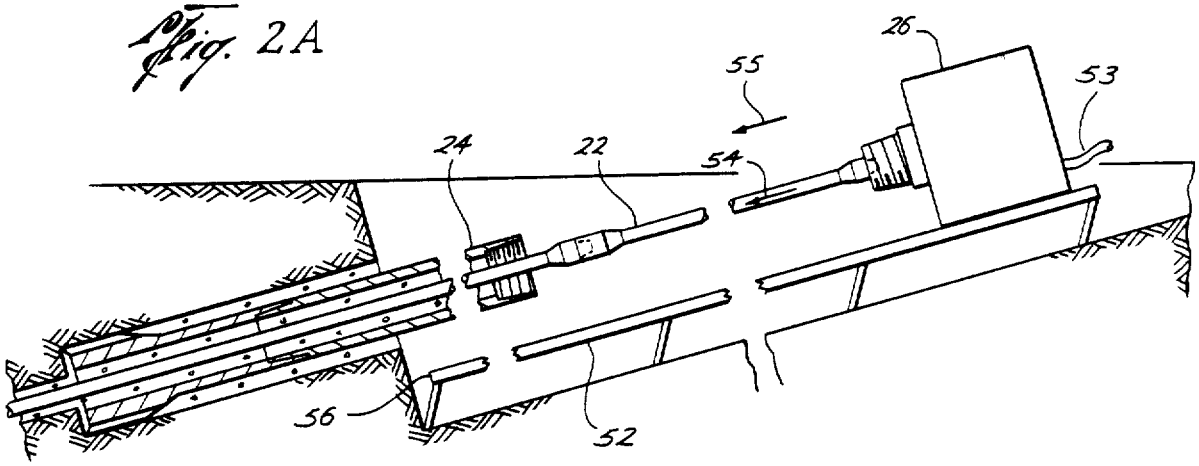
FIG. 2A is a schematic view illustrating one method of advancing the drill string into the hole during the drilling of the pilot hole.

FIGS. 2A illustrates in more detail one method of advancing drill string 22. The trailing end of drill string 22 is attached to a chuck on drill rig 26. (One embodiment of a suitable drill rig 26 is described in U.S. Pat. Nos. 4,051,911 and 4,078,617.) Drill rig 26 is advanced down ramp 52 as shown by arrow 55 to crowd drill string 22 into the hole. Drilling mud is pumped through conduit 53, through drill rig 26, and down through drill string 22 as shown by arrow 54. When drill rig 26 reaches lower end 56 of ramp 52, drill rig 26 is drawn back up ramp 52 to the position shown in FIG. 2A. Drill rig 26 is now ready for the attachment of another section of drill string to the trailing end of drill string 22 to again advance the drill string or for the attachment of another section of washover pipe to the trailing end of washover pipe 24 to advance the washover pipe.

Figure 2B:
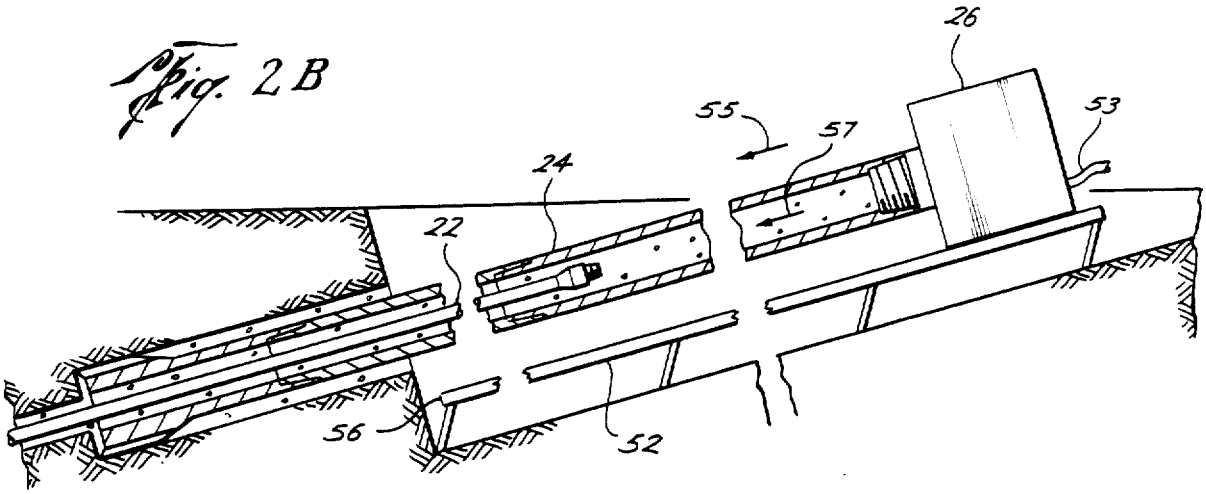
FIG. 2B is a schematic view illustrating one method of advancing the washover pipe into the hole during the drilling of the pilot hole.

FIG. 2B illustrates in more detail one method of advancing washover pipe 24. The trailing end of washover pipe 24 is attached to a chuck on drill rig 26. Drill rig 26 is advanced down ramp 52 as shown by arrow 55 to crowd washover pipe 24 into the hole. Drilling mud is pumped through conduit 53, through drill rig 26, and down through washover pipe 24 as shown by arrow 57. When drill rig 26 reaches lower end 56 of ramp 52, drill rig 26 is drawn back up ramp 52 to the position shown in FIG. 2B. Drill rig 26 is now ready for the attachment of another section of washover pipe to the trailing end of washover pipe 24 to again advance the washover pipe or for the attachment of another section of drill string to the trailing end of drill string 22 to advance the drill string.

Referring again to FIG. 1, when drill string 22 reaches the surface on the other side of water course 10 at point 14, washover pipe 24 is advanced to also exit at point 14. Drill string 22 is withdrawn from the pilot hole, leaving the washover pipe occupying the entire pilot hole from point 12 to point 14.

Figure 3:
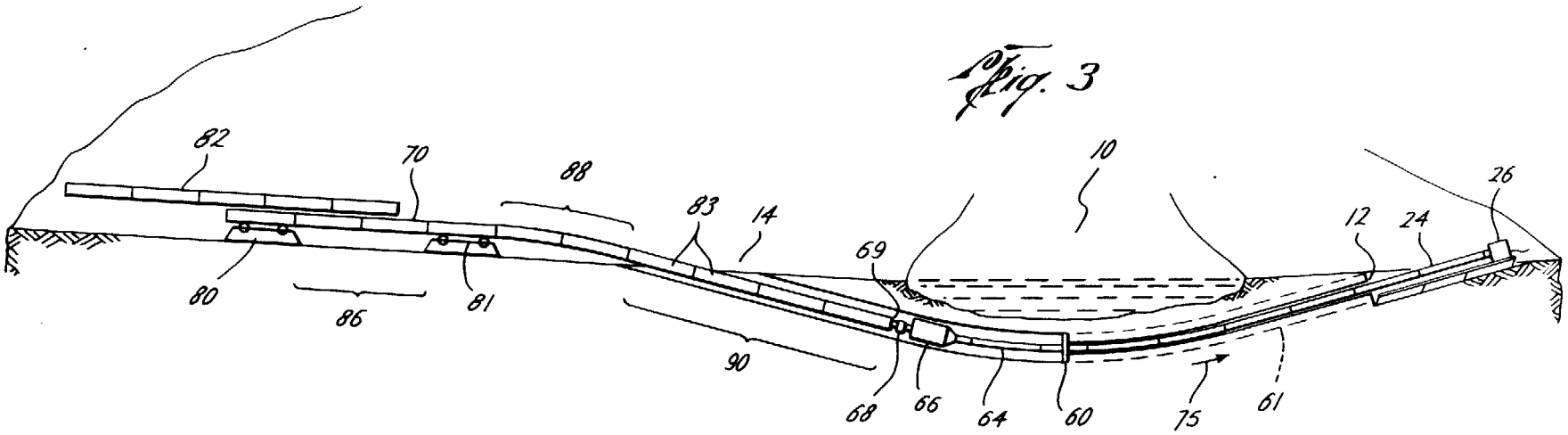
FIG. 3 is a cross-sectional elevation view illustrating the operation of the present invention in reaming the pilot hole and installing a production casing along the reamed hole.

To prepare for the reaming and installation operation, as is shown by FIG. 3, first reamer 60 is attached to washover pipe 24 where the latter extends out the pilot hole at point 14. Second reamer 66 is attached to the other end of first reamer 60 by a section of washover pipe 64 to provide for some separation between the reamers. Preferably the reamers should be separated a distance of 5 to 15 times the diameter of the reamed hole. For a 36 inch hole, a separation of 30 feet provides good results. Production casing (or conduit or flow pipe) 70 is attached to the other end of second reamer 66 by a swivel 68 to prevent rotation of casing 70 during the reaming and the installation operation. The leading end 69 of casing 70 is closed to prevent the entry of mud and cuttings during the reaming and installation operation. Since the hole sometimes contains water or mud, casing 70 may be weighted to neutralize its buoyancy so that it floats into the hole, facilitating its installation and minimizing any damage to the casing, as described in U.S. Pat. No. 3,894,402.

The remaining length of the first portion of production casing 70 is supported in line with the pilot hole some distance above the ground on rollers 80 and 81 located beyond pilot hole exit point 14. Two rollers are shown, but more may be provided. The first portion of production casing 70 consists of a plurality of casing joints, such as those numbered 83, joined end to end. The first portion of production casing 70 may constitute the entire length of casing to be installed but this may be unwieldly. Hence, it may desirable to provide one or more additional portions of production casing, such as casing portion 82. Casing portion 82 is joined to the trailing end of casing portion 70 after most of casing portion 70 has been installed along reaming path 61. If necessary, additional portions of production casing like casing portion 82 may be fabricated.

Figure 4:
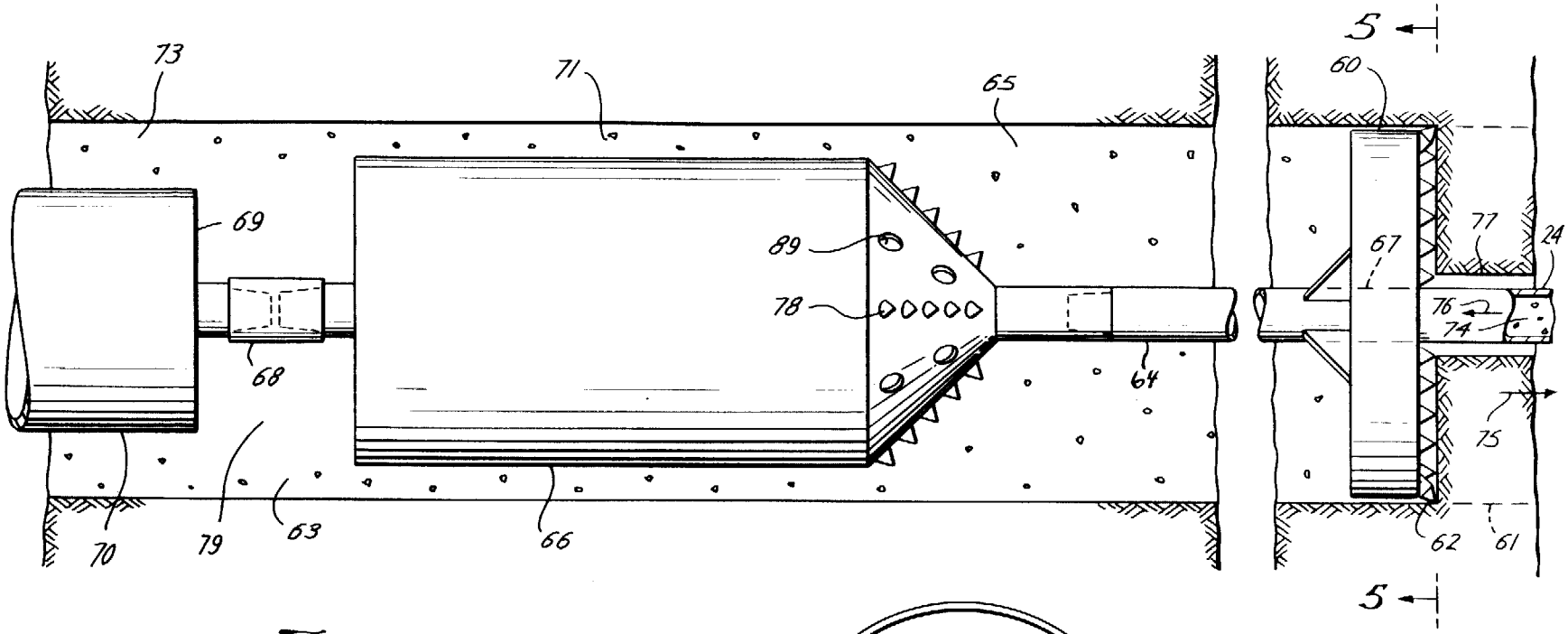
FIG. 4 is an elevation view of the leading end of the reaming apparatus and production casing illustrated in FIG. 3.
Figure 5:
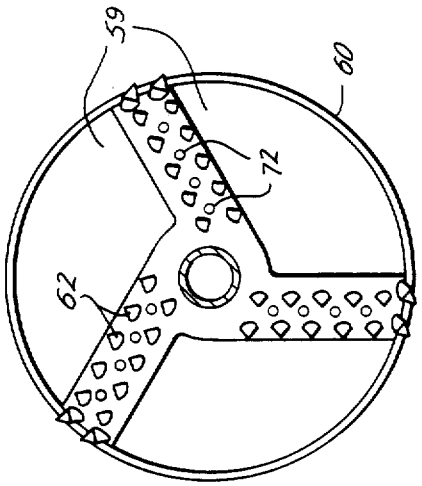
FIG. 5 is a front view of the leading end of the leading reamer illustrated in FIGS. 3 and 4.

The reaming apparatus is shown in more detail in FIGS. 4 and 5. As should be evident from FIG. 4, first reamer 60 is of a larger diameter than second reamer 66. As shown in FIG. 5, first reamer 60 has a plurality of reaming teeth 62, as well as a plurality of ports 72 through which drilling mud exits to entrain the cuttings dislodged by the reamer. Typically first reamer 60 is a flycutter reamer of relatively small length having longitudinal openings 59, as shown in FIG. 5, through which the drilling mud and entrained cuttings may pass into the enlarged hole. As shown in FIG. 4, second reamer 66 has a smaller, typically frustoconical, leading end provided with reaming teeth 78. Ports 89 are optional and, when provided, provide further exits for drilling mud in addition to ports 72 in first reamer 60. Typically second reamer 66 is a floating reamer of substantially neutral buoyancy in drilling mud weighing approximately 10 pounds per gallon so as to float through the enlarged hole. The trailing end of second reamer 66 is typically cylindrical and of smaller diameter than first reamer 60 and of larger diameter than production casing 70. For example, first reamer 60 may be of 36" diameter, second reamer 66 of 30" diameter, and production casing 70 of 24" diameter.

The reaming and production casing installation operation proceeds generally as is shown in FIG. 3. Washover pipe 24 is rotated and drawn through the pilot hole in the direction of arrow 75 by drill rig 26. Reamers 60 and 66 are rotated and drawn along reaming path 61 by the rotating washover pipe. Swivel 68 draws production casing 70 along behind second reamer 66 and prevents casing 70 from rotating with the reamers so that the casing is not subjected to the torsional stress which would be caused by rotation. Drilling mud is provided to flow from drill rig 26 through washover pipe 24 and exit at first reamer 60, and, optionally, at second reamer 66.

Sufficient drilling mud must be provided at the reamers to lubricate the advance of production casing 70. If there is too little lubrication, the force which must be exerted on washover pipe 24 in order to draw the reaming apparatus and production casing 70 along drilling path 61 will be so large that washover pipe 24 will knife into the soil and cause the reaming apparatus and production casing 70 to leave drilling path 61. For example, it has been found that the use of a pump supplying 15 barrels of drilling mud a minute to the reamers at a pressure of 900–1100 PSI provides sufficient lubrication to install a 24" production casing.

Typically, the reaming apparatus and production casing are attached to the end of the washover pipe at point 14, but it should be understood that these may be attached to the end of the washover pipe at point 12, in which case the reaming and installation operation would proceed in the direction opposite the one illustrated in FIG. 3. This would, of course, require that drill rig 26, or one like it, be provided at point 14, rather than at point 12, as illustrated in FIG. 3.

The reaming and production casing installation operation is illustrated in more detail by FIG. 4. As the apparatus is rotated and drawn along drilling path 61 in the direction of arrow 75 by washover pipe 24, reaming teeth 62 of first reamer 60 enlarge pilot hole 77 to a diameter greater than that of production casing 70. Drilling mud 74 pumped through washover pipe 24 in the direction of arrow 76 exits through ports 72 in first reamer 60 (shown in FIG. 5) to entrain the cuttings dislodged by reaming teeth 62. The separation provided between first reamer 60 and second reamer 66 by the section of washover pipe 64 permits the cuttings to separate within the drilling mud in space 65 and produces a more accurate hole. Reaming teeth 78 on second reamer 66 further break up and separate the cuttings. Optionally an open passage may be provided through hub 67 of first reamer 60 such that some of the drilling mud 74 continues through hub 67 and section of washover pipe 64 to exit at optional ports 89 in second reamer 66. Second reamer 66, of a smaller diameter than first reamer 60 and a larger diameter than production casing 70, forces the drilling mud and entrained cuttings into annulus 71. The mud and cuttings form a concentric ring 63 around the interior of the enlarged hole while leaving a concentric opening 79 within this ring for passage of the even smaller diameter production casing. Production casing 70, of a smaller diameter than reamers 60 and 66, is drawn into the enlarged hole behind second reamer 66 by swivel 68. Swivel 68 prevents production casing 70 from rotating. The ring 63 of mud and cuttings acts as a bushing in the concentric annulus 73 between production casing 70 and the sides of the enlarged hole to lubricate the advance of production casing 70. Since leading end 69 of casing 70 is closed, the mud and cuttings do not enter the casing.

Referring again to FIG. 3, as non-rotating production casing 70 is drawn along drilling path 61 behind second reamer 66, the length of the first portion of production casing 70 which is outside the hole is drawn along rollers 80 and 81 towards point 14 where the casing enters the hole. The distance between rollers 80 and 81 depends on the strength and characteristics of the production casing. The distance must be short enough that the unsupported part of the production casing 86 which is between rollers 80 and 81 is not subjected to such stress due to its own weight that there is a risk of casing failure. That part of the casing 86 which is between rollers 80 and 81 advances horizontally, and that part of the casing 88 which is between rollers 81 and point 14 bends towards point 14, advancing at a downward angle and entering the hole at point 14. The weight of the downward-angled part of the casing 88 which is between rollers 81 and point 14 helps crowd casing 70 into the hole and reduces the force required to draw the casing along reaming path 61. Advancement of casing 70 is further aided by the weight of that part of the casing 90 which is within the hole along the downward-angled portion of reaming path 61.

Using the weight of part of the casing to crowd the casing into hole eliminates the need for powered means to thrust casing 70 into the hole behind the reaming appratus as in existing methods. Furthermore, since casing 70 bends from its horizontal path along rollers 80 and 81 down to point 14 along the entire length of part 88 of the casing between rollers 81 and point 14, the shear stress on the casing and risk of casing failure are much less than when casing 70 is placed on the ground immediately in front of point 14 and must bend into the hole over a relatively short distance.

When most of the first portion of production casing 70 has been drawn into the hole, the trailing end of casing portion 70 is lifted off of rollers 80 and 81 and onto the ground, casing portion 82 is joined to the trailing end of casing portion 70, the casing is lifted back onto the rollers, and the reaming and installation process continues. Since casing portions 70 and 82 consist of many casing sections, such as those numbered 83, it is unnecessary to frequently interrupt the installation operation in order to join additional casing sections to the trailing end of the casing extending out of the hole.

Figure 6:
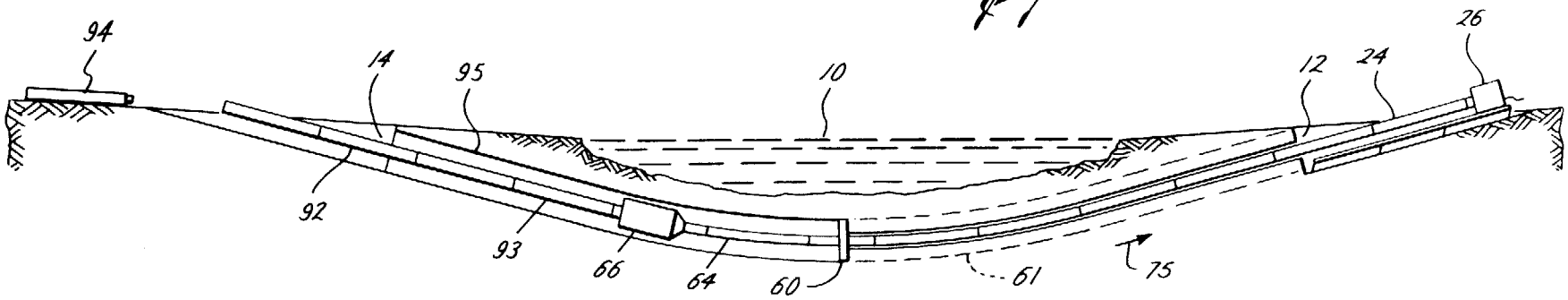
FIG. 6 is a cross-sectional elevation view illustrating an alternate embodiment of the present invention in which the reaming operation proceeds without installing the production casing.

In an alternative embodiment of the invention the reaming operation may be performed without production casing 70 attached to second reamer 66, followed by a second reaming operation with the production casing attached in order to complete the installation. In the first reaming operation, illustrated by FIG. 6, a section of washover pipe 93 is attached to the trailing end of second reamer 66. As the reaming apparatus and trailing washover pipe is drawn along reaming path 61 additional sections of washover pipe, such as section 94 are joined to the trailing end of washover pipe section 93, to form washover pipe string 92. Sections of the leading washover pipe 24 are removed as they exit the hole at point 12. When the reaming operation is completed and the reaming apparatus reaches point 12, the reaming apparatus is disconnected from washover pipe string 92, transported aboveground to point 14, and attached to the end of washover pipe string 92 where it exits the enlarged hole at point 14. Swivel 68 and production casing 70 are attached to second reamer 66 as described above and shown in FIG. 3. Washover pipe string 92 functions as washover pipe 24 for purposes of the second reaming operation, which includes installation of the production casing and proceeds as described above and illustrated in FIGS. 3 and 4.

It is also possible to use washover pipe string 92 to draw the reaming apparatus back through the enlarged hole from point 12 to point 14 after the initial reaming operation is completed rather than transporting the reaming apparatus aboveground to point 14. As the reaming apparatus is being drawn back through the enlarged hole, the sections of washover pipe 24 which were removed at point 12 during the reaming operation are reattached to the now trailing end of washover pipe 24 at point 12, again providing a washover pipe 24 extending from point 12 to point 14 in enlarged hole 95. Sections of washover pipe string 92 are removed as they exit at point 14 and, when the reaming apparatus reaches point 14, washover pipe section 93 is removed. Swivel 68 and production casing 70 are attached to second reamer 66 and a second reaming operation including installation of the production casing proceeds as described above and illustrated in FIGS. 3 and 4.

Although the foregoing description assumes that drilling mud used in these operations will flow back through the drilled hole to the entrance of the hole, carrying cuttings with it, in many types of formations little or no returns will be obtained. In very porous [of] *or* uncompacted formations the cuttings and a major portion of the drilling mud may be forced into the surrounding formation, building up a tubular bushing around the drill pipe, washover pipe, reamer or casing, as the case may be. In the embodiment of the invention in which the hole is first reamed without the casing, following by a second reaming and pulling the casing through, such a bushing may be formed by the first reaming operation, thereby facilitating the passage of the reamer and casing on the second reaming operations. The lubricity of the drilling mud being pumped through in the second reaming operation will greatly improve the ability to pull the casing through this tubular bushing. The presence of the bushing will help to seal the walls of the hole so as to improve the returns of the drilling mud, thereby providing lubrication of the casing throughout substantially its entire length.

While preferred embodiments of the present invention have been illustrated in detail, modifications and adaptations of these embodiments will occur in those skilled in the art, and many modifications and variations of these embodiments may be made without departing from the spirit of the present invention.

I claim:

[1. A method for placing a casing along an underground inverted arcuate path comprising:

drawing reaming apparatus together with said casing in a following relationship to said reaming apparatus along an underground inverted arcuate path, without any substantial rotation of said casing.]

[2. A method according to claim 1 further comprising rotating said reaming apparatus simultaneously with said drawing step.]

[3. A method according to claim 1 further comprising supplying drilling mud to said reaming apparatus simultaneously with said drawing, said drilling mud exiting at said reaming apparatus into the hole produced by said reaming apparatus.]

[4. A method according to claim 1 further comprising, prior to said drawing, placing the length of said casing which is behind said reaming apparatus above and behind the point where said casing enters said path.]

[5. A method according to claim 1 further comprising, prior to said drawing, placing the length of said casing which is behind said reaming apparatus on rollers located above and behind the point where said casing enters said path.]

[6. A method for placing a casing along an underground inverted arcuate path comprising:

placing a pipe having two ends along an underground inverted arcuate path, until said path completely occupies said path;

attaching reaming apparatus to one end of said pipe;

attaching one end of said casing to said reaming apparatus in following relationship to said reaming apparatus; and drawing said pipe along said path without rotating said casing, whereby said reaming apparatus and said casing are drawn along said path.]

[7. A method according to claim 6 wherein said attaching of said reaming apparatus to said pipe comprises:

non-rotatably attaching said reaming apparatus to one end of said pipe.]

[8. A method according to claim 6 wherein said attaching of said casing to said reaming apparatus comprises:

attaching one end of said casing, of a smaller diameter than said reaming apparatus, to said reaming apparatus in following relationship to said reaming apparatus.]

[9. A method according to claim 6 wherein said attaching of said casing to said reaming apparatus comprises:

rotatably attaching one end of said casing to said reaming apparatus in following relationship to said reaming apparatus.]

[10. A method according to claim 6 wherein said attaching of said casing to said reaming apparatus further comprises:

closing the end of said casing which is attached to said reaming apparatus.]

[11. A method according to claim 6 further comprising rotating said reaming apparatus simultaneously with said drawing.]

[12. A method according to claim 6 further comprising supplying drilling mud through said pipe to said reaming apparatus simultaneously with said drawing, said drilling mud exiting at said reaming apparatus into the hole produced by said reaming apparatus.]

[13. A method according to claim 6 wherein said reaming apparatus is of a larger diameter than said casing to provide an annulus between the hole produced by said reaming apparatus and said casing and further comprising supplying drilling mud through said pipe simultaneously with said drawing, said drilling mud exiting at said remaining apparatus, entraining the cuttings produced by said reaming apparatus, and flowing into said annulus.]ep

[14. A method according to claim 6 further comprising, prior to said drawing, placing the length of said casing which is behind said reaming apparatus above and behind the point where said casing enters said path.]

[15. A method according to claim 6 further comprising, prior to said drawing, placing the length of said casing which is behind said reaming apparatus on rollers located above and behind the point where said casing enters said path.]

[16. A method for placing a casing along an underground inverted arcuate path comprising:

placing a drill string along said path until said drill string completely occupies said path;

placing a pipe having two ends and being of a larger diameter than said drill string, along said path surrounding said drill string;

attaching reaming apparatus to one end of said pipe;

attaching one end of said casing to said reaming apparatus in following relationship to said reaming apparatus, and drawing said pipe along said path whereby said reaming apparatus and said casing are drawn along said path.]

[17. A method according to claim 16 wherein placing said pipe along said path comprises:

rotating and simultaneously thrusting said pipe along said path circumscribing said drill string, the inside diameter of said pipe being larger than the outside diameter of said drill string so as to provide an inner annulus between said pipe and said drill string;

providing cutting apparatus at the leading end of said pipe and cutting a hole of larger diameter than said pipe with said cutting apparatus, so as to provide an outer annulus between the inside surface of said hole and said pipe;

pumping drilling mud through said inner annulus to said leading end of said pipe, said drilling mud entraining cuttings dislodged by said cutting apparatus and flowing away from said leading end through said outer annulus.]

[18. A method according to claim 16 further comprising removing said drill string from within the pipe surrounding it along said path before attaching said reaming apparatus.]

19. A method for placing a casing along an underground inverted arcuate path comprising:

placing a pipe having two ends along an underground inverted arcuate path, until said pipe completely occupies said path;

attaching a first reamer to one end of said pipe;

attaching a second reamer to said first reamer in following relationship to said first reamer;

attaching one end of said casing to said second reamer in following relationship to said second reamer; and drawing said pipe along said path whereby said first and second reamers and said casing are drawn along said path.

20. A method according to claim 19 wherein attaching said second reamer to said first reamer comprises attaching said second reamer to said first reamer at some distance behind said first reamer.

21. A method according to claim 19 wherein attaching said second reamer to said first reamer comprises attaching said second reamer to said first reamer at a distance behind said first reamer of from 5 to 15 times said first diameter.

22. A method for placing a casing along an underground inverted arcuate path comprising:

placing a pipe having two ends along an underground inverted arcuate path, until said pipe completely occupies said path;

attaching a first reamer of a first diameter to one end of said pipe;

attaching a second reamer of a second diameter to said first reamer in following relationship to said first reamer, said second diameter being smaller than said first diameter;

attaching one end of said casing to said second reamer in following relationship to said second reamer; and drawing said pipe along said path whereby said first and second reamers and said casing are drawn along said path.

[23. A method for placing a casing along an underground inverted arcuate path comprising:

placing a pipe having two ends along an underground inverted arcuate path, until said pipe completely occupies said path;

non-rotatably attaching reaming apparatus to one end of said pipe;

attaching one end of said casing to said reaming apparatus in following relationship to said reaming apparatus;

drawing said pipe along said path whereby said reaming apparatus and said casing are drawn along said path; and rotating said pipe simultaneously with said drawing to rotate said reaming apparatus.]

[24. A method for placing a casing along an underground inverted arcuate path comprising:

placing a pipe having two ends along an inverted arcuate path, until said pipe completely occupies said path;

non-rotatably attaching reaming apparatus to one end of said pipe;

rotatably attaching one end of said casing to said reaming apparatus in following relationship to said reaming apparatus;

drawing said pipe along said path whereby said reaming apparatus and said casing are drawn along said path; and rotating said pipe simultaneously with said drawing, whereby said reaming apparatus, but not said casing, is rotated.]

[25. A method for placing a casing along an underground inverted arcuate path, until said pipe completely occupies said path comprising:

placing a pipe having two ends along an underground inverted arcuate path, until said pipe completely occupies said path;

attaching reaming apparatus to one end of said pipe;

attaching one end of said casing to said reaming apparatus in following relationship to said reaming apparatus;

drawing said pipe along said path whereby said reaming apparatus and said casing are drawn along said path; and supplying drilling mud through said pipe to said reaming apparatus simultaneously with said drawing, said drilling mud existing at said reaming apparatus into the hole produced by said reaming apparatus.]

[26. A method for placing a casing along an underground inverted arcuate path comprising:

placing a drill string along said path from a first location to a second location;

placing a pipe of a larger diameter than said drill string surrounding said drill string along said path from said first location to said second location;

attaching reaming apparatus to said pipe at second location;

attaching one end of said casing to said reaming apparatus in following relationship to said reaming apparatus;

drawing said pipe along said path from said second location to said first location, whereby said reaming apparatus and said casing are drawn along said path from said second location to said first location.]

[27. A method according to claim 26 wherein placing said pipe along said path comprises:

rotating and simultaneously thrusting said pipe along said path circumscribing said drill string, the inside diameter of said pipe being larger than the outside diameter of said drill string to provide an inner annulus between said pipe and said drill string;

providing cutting apparatus at the leading end of said pipe and cutting a hole of larger diameter than said pipe with said cutting apparatus, to provide an outer annulus between the inside surface of said hole and said pipe;

pumping drilling mud through said inner annulus to said leading end of said pipe, said drilling mud entraining cuttings dislodged by said cutting apparatus and flowing away from said leading end through said outer annulus.]

[28. A method according to claim 26 which further comprises removing said drill string from within the pipe surrounding it before said step of attaching said reaming apparatus to one end of said pipe.]

[29. A method according to claim 26 wherein said attaching of said reaming apparatus to said pipe comprises:

attaching a first reamer to the end of said pipe at said second location; and attaching a second reamer to said first reamer in following relationship to said first reamer.]

[30. A method according to claim 29 wherein attaching said second reamer to said first reamer comprises attaching said second reamer to said first reamer at some distance behind said first reamer.]

[31. A method according to claim 29 wherein attaching said second reamer to said first reamer comprises attaching said second reamer to said frist reamer at a distance behind said first reamer of from 5 to 15 times the diameter of said first reamer.]

[32. A method according to claim 26 wherein said attaching of said reaming apparatus to said pipe comprises:

attaching a first reamer of a first diameter to the end of said pipe at said second location; and attaching a second reamer of a second diameter to said first reamer in following relationship to said first reamer, said second diameter being smaller than said first diameter.]

[33. A method according to claim 26 wherein said attaching of said reaming apparatus to said pipe comprises:

non-rotatably attaching said reaming apparatus to one end of said pipe at said second location.]

[34. A method according to claim 33 further comprising rotating said pipe simultaneously with said drawing to rotate said reaming apparatus.]

[35. A method according to claim 26 wherein said attaching of said casing to said reaming apparatus comprises:

attaching one end of said casing to said reaming apparatus in following relationship to said reaming apparatus, said casing being of a smaller diameter than said reaming apparatus.]

[36. A method according to claim 26 wherein said attaching of said casing to said reaming apparatus comprises:

rotatably attaching one end of said casing to said reaming apparatus in following relationship to said reaming apparatus.]

[37. A method according to claim 26 wherein said attaching of said casing to said reaming apparatus includes:

closing the end of said casing which is attached to said remaining apparatus.]

[38. A method according to claim 26 wherein said attaching said reaming apparatus to said pipe further comprises non-rotatably attaching said reaming apparatus to said pipe at said second location;

said attaching of one end of said casing to said reaming apparatus further comprises rotatably attaching one end of said casing to said reaming apparatus in following relationship to said reaming apparatus; and rotating said pipe simultaneously with said drawing, whereby said reaming apparatus, but not said casing, is rotated.]

[39. A method according to claim 26 further comprising rotating said reaming apparatus simultaneously with said drawing.]

[40. A method according to claim 26 further comprising supplying drilling mud to said reaming apparatus simultaneously with said drawing, said drilling mud exiting at said reaming apparatus into the hole produced by said reaming apparatus.]

[41. A method according to claim 26 further comprising supplying drilling mud from said first location through said pipe to said reaming apparatus simultaneously with said drawing, said drilling mud exiting at said reaming apparatus into the hole produced by said reaming apparatus.]

[42. A method according to claim 26 wherein said reaming apparatus is of a larger diameter than said casing to provide an annulus between the hole produced by said reaming apparatus and said casing and further comprising supplying drilling mud simultaneously with said drawing, said drilling mud exiting at said reaming apparatus, entraining the cuttings produced by said reaming apparatus, and flowing into said annulus.]

[43. A method according to claim 26 further comprising, prior to said drawing, placing the length of said casing which is behind said reaming apparatus above and behind said second location.]

[44. A method according to claim 26 further comprising, prior to said drawing, placing the length of said casing which is behind said reaming apparatus on rollers located above and behind said second location.]

[45. A method for placing a casing along an underground inverted arcuate path comprising:

placing a pipe having two ends along said path;

forcing said drilling mud and entrained cuttings into the annulus between said hole of first diameter and said second reamer of said second, smaller diameter with said second reamer, thereby forming a concentric ring of said drilling mud and cuttings around the interior of said hole while leaving an opening within said ring for passage of said casing of said third, smaller diameter.]

[46. A method of advancing a pipe into the ground along an inverted arcuate path, said pipe circumscribing a smaller drill string comprising:

advancing said drill string into the ground;

rotating and simultaneously thrusting said pipe along said path circumscribing said drill string, the inside diameter of said pipe being larger than the outside diameter of said drill string so as to provide an inner annulus between said pipe and said drill string;

providing cutting apparatus at the leading end of said pipe and cutting a hole of larger diameter than said pipe with said cutting apparatus to provide an outer annulus between the inside surface of said hole and said pipe;

pumping drilling mud through said inner annulus to said leading end of said pipe simultaneously with said rotating, said drilling mud entraining cuttings dislodged by said cutting apparatus and flowing away from said leading end through said outer annulus.]

[47. A method according to claim 46 further comprising:

non-rotatably attaching the trailing end of said pipe to a chuck on a drill rig located outside of the entry point of the pipe into the ground;

rotating said chuck and simultaneously advancing said drill rig towards said entry point, whereby said pipe is rotated and simultaneously thrust into the ground;

pumping drilling mud into and through said drill rig into said pipe simultaneously with said rotating.]

[48. A method for placing a casing along an underground inverted arcuate path comprising:

placing a drill string along said path;

placing a first pipe of larger diameter than said drill string surrounding said drill string along said path;

attaching the leading end of reaming apparatus having a leading end and a trailing end to said first pipe;

attaching a second pipe to said trailing end of said reaming apparatus;

non-rotatably attaching a first reamer of a first diameter to one end of said pipe;

non-rotatably attaching a second reamer of a second diameter smaller than said first diameter to said first reamer in following relationship to said first reamer at a distance behind said first reamer of from 5 to 15 times said first diameter;

rotatably attaching one end of said casing, said casing being of a third diameter smaller than said second diameter, to said second reamer in following relationship to said second reamer;

closing the end of said casing which is attached to said second reamer;

placing the length of said casing which is behind said second reamer above and behind the point where said casing enters said path;

rotating said pipe, whereby said reamers are rotated but said casing is not rotated;

simultaneously drawing said pipe along said path whereby said reamers followed by said casing are drawn along said path;

supplying drilling mud through said pipe to said reamers simultaneously with said drawing, said drilling mud exiting at said reamers into the hole of said first diameter produced by said first reamer, said drilling mud entraining cuttings produced by said first reamer;

drawing said first pipe followed by said reaming apparatus and said second pipe along said path until said second pipe completely occupies said path;

removing said reaming apparatus from said first and second pipes;

attaching said leading end of said reaming apparatus to said second pipe;

attaching said casing to said trailing end of said reaming apparatus; and drawing said second pipe along said path said reaming apparatus and said casing are drawn along said path.]

49. A method according to claim [48] *74* further comprising rotating said reaming apparatus simultaneously with said drawing of said first pipe.

50. A method according to claim [48] *74* wherein said attaching of said leading end of said reaming apparatus to said first pipe comprises non-rotatably attaching said leading end of said reaming apparatus to said first pipe; and rotating said first pipe simultaneously with said drawing of said first pipe, whereby said reaming apparatus is rotated.

51. A method according to claim [48] *74* further comprising rotating said reaming apparatus simultaneously with said drawing of said second pipe.

52. A method according to claim [48] *74* wherein said attaching of the leading end of said reaming apparatus to said second pipe further comprises nonrotatably attaching the leading end of said reaming apparatus of said second pipe;

said attaching of said casing to the trailing end of said reaming apparatus further comprises rotatably attaching said casing to the trailing end of said reaming apparatus; and rotating said second pipe simultaneously with said drawing of said second pipe, whereby said reaming apparatus, but not said casing, is rotated.

53. A method according to claim [48] *74* further comprising supplying drilling mud to said reaming apparatus simultaneously with said drawing of said first pipe, said drilling mud exiting at said reaming apparatus into the hole produced by said reaming apparatus.

54. A method according to claim [48] *74* further comprising supplying drilling mud through said first pipe to said reaming apparatus simultaneously with said drawing of said first pipe, said drilling mud exiting at said reaming apparatus into the hole produced by said reaming apparatus.

55. A method according to claim [48] *74* wherein said reaming apparatus is of a larger diameter than said casing to provide an annulus between the hole produced by said reaming apparatus and said casing and further comprising supplying drilling mud to said reaming apparatus simultaneously with said drawing of said second pipe, said drilling mud exiting at said reaming apparatus, entraining the cuttings produced by said reaming apparatus, and flowing into said annulus.

56. A method according to claim [48] *74* further comprising, prior to said drawing of said second pipe, placing the length of said casing which is behind said reaming apparatus above and behind the point where said casing enters said path.

57. A method according to claim [48] *74* further comprising, prior to said drawing of said second pipe, placing the length of said casing which is behind said reaming apparatus on rollers located above and behind the point where said casing enters said path.

*58. A method for placing a casing along an underground inverted arcuate path beneath an obstacle which comprises*

*drilling a pilot hole with a pilot drill string along an inverted arcuate path from one side of the obstacle to the other side,*

*enlarging the pilot hole by drilling with a washover pipe circumscribing the pilot drill string along said inverted arcuate path,*

*attaching a reamer to the washover pipe on the other side of the obstacle,*

*reaming the enlarged hole to further enlarge it to a size larger than the casing by rotating and pulling the reamer by means of said washover pipe along the inverted arcuate path from said other side of the obstacle to said one side of the obstacle by means of said washover pipe,*

*and pulling the casing, with substantially no rotation, along said inverted arcuate path from said other side of the obstacle.*

*59. A method as defined by claim 58 wherein the casing is pulled along the inverted arcuate path while the enlarged hole is being reamed.*

*60. A method as defined by claim 58 wherein the casing is pulled along the inverted arcuate path after the enlarged hole has been reamed.*

*61. A method as defined by either of claims 59 or 60, in which the reaming step is performed by a first reamer and by a second reamer following behind the first reamer.*

*62. A method as defined by claim 61 in which the second reamer is smaller in diameter than the first reamer.*

*63. A method as defined by either of claims 59 or 60 in which, prior to being pulled along the inverted arcuate path, the casing is placed on rollers located above and behind the point where said casing enters said path.*

*64. A method for placing a casing along an underground inverted arcuate path beneath an obstacle which comprises*

*drilling a pilot hole with a pilot drill string along an inverted arcuate path from one side of the obstacle to the other side;*

*enlarging the pilot hole by drilling with a washover pipe circumscribing the pilot drill string along said inverted arcuate path;*

*attaching a reamer to the end of the washover pipe on the other side of the obstacle;*

*attaching the end of the casing to the reamer with a connection between the casing and the reamer which permits rotation of the reamer without rotating the casing; and*

*reaming the enlarged hole to further enlarge it to a size larger than the casing by rotating the washover pipe, and thereby rotating the reamer, and pulling on the washover pipe to pull the reamer and the casing along the inverted arcuate path from said other side of the obstacle to said one side of the obstacle, at the same time the hole is being reamed.*

*65. A method which comprises*

*drilling a pilot hole through the earth and under an obstacle, with a pilot drill string, along an inverted arcuate path from one side of the obstacle to the other side;*

*enlarging the pilot hole by drilling with a washover pipe circumscribing the pilot drill string along said inverted arcuate path;*

*attaching the leading end of a reamer having a leading and a trailing end to the washover pipe on the other side of the obstacle;*

*attaching the leading end of another pipe to the trailing end of the reamer; and*

*reaming the enlarged hole to further enlarge it by rotating and pulling the reamer along the inverted arcuate path from said other side of the obstacle to said one side of the obstacle, while at the same time pulling said other pipe until it occupies the inverted arcuate path from said other side to said one side.*

*66. A method as defined by claim 65, and thereafter pulling a third, larger diameter pipe along the inverted arcuate path until it occupies said path from said other side to said one side.*

*67. A method as defined by claim 66, wherein said third pipe is pulled by means of said other pipe connected through a reamer, said other pipe and said reamer being rotated while said third pipe is being pulled.*

*68. A method for placing a casing along an underground inverted arcuate path comprising*

*placing said casing on rollers located above and behind the point where said casing enters said path; and*

*reaming said underground inverted arcuate path by rotating and drawing reaming apparatus together with said casing in a following relationship to said reaming apparatus along said underground inverted arcuate path, without any substantial rotation of said casing.*

*69. A method for placing a casing along an underground inverted arcuate path comprising*

*placing a drill string along said path from a first location to a second location;*

*placing a pipe of a larger diameter than said drill string surrounding said drill string along said path from said first location to said second location;*

*attaching a first reamer to the end of said pipe at said second location;*

*attaching a second reamer to said first reamer in following relationship to said first reamer;*

*attaching one end of said casing to said second reamer in following relationship to said second reamer; and*

*drawing said pipe along said path from said second location to said first location, whereby said reamers and said casing are drawn along said path from said second location to said first location.*

*70. A method according to claim 69, wherein attaching said second reamer to said first reamer comprises attaching said second reamer to said first reamer at some distance behind said first reamer.*

*71. A method according to claim 69, wherein attaching said second reamer to said first reamer comprises attaching said second reamer to said first reamer at a distance behind said first reamer of from 5 to 15 times the diameter of said first reamer.*

*72. A method according to claim 69 further comprising, prior to said drawing, placing the length of said casing which is behind said reaming apparatus on rollers located above and behind said second location.*

*73. A method for placing a casing along an underground inverted arcuate path comprising*

*placing a pipe having two ends along said path;*

*non-rotatably attaching a first reamer of a first diameter to one end of said pipe;*

*non-rotatably attaching a second reamer of a second diameter smaller than said first diameter to said first reamer in following relationship to said first reamer at a distance behind said first reamer of from 5 to 15 times said first diameter;*

*rotatably attaching one end of said casing, said casing being of a third diameter smaller than said second diameter, to said second reamer in following relationship to said second reamer;*

*closing the end of said casing which is attached to said second reamer;*

*placing the length of said casing which is behind said second reamer above and behind the point where said casing enters said path;*

*rotating said pipe, whereby said reamers are rotated but said casing is not rotated;*

*simultaneously drawing said pipe along said path whereby said reamers followed by said casing are drawn along said path;*

*supplying drilling mud through said pipe to said reamers simultaneously with said drawing, said drilling mud exiting at said reamers into the hole of said first diameter produced by said first reamer, said drilling mud entraining cuttings produced by said first reamer;*

*forcing said drilling mud and entrained cuttings into the annulus between said hole of first diameter and said second reamer of said second, smaller diameter with said second reamer, thereby forming a concentric ring of said drilling mud and cuttings around the interior of said hole while leaving an opening within said ring for passage of said casing of said third, smaller diameter.*

*74. A method for placing a casing along an underground inverted arcuate path comprising*

*placing a drill string along said path;*

*placing a first pipe of larger diameter than said drill string surrounding said drill string along said path;*

*attaching the leading end of reaming apparatus having a leading end and a trailing end to said first pipe;*

*attaching a second pipe to said trailing end of said reaming apparatus;*

*drawing said first pipe followed by said reaming apparatus and said second pipe along said path until said second pipe completely occupies said path;*

*removing said reaming apparatus from said first and second pipes;*

*attaching said leading end of said reaming apparatus to said second pipe;*

*attaching said casing to said trailing end of said reaming apparatus; and*

*drawing said second pipe along said path so that said reaming apparatus and said casing are drawn along said path.*

*75. A method for placing a casing along an underground inverted arcuate path comprising*

*placing the casing on rollers located above and behind the point where said casing enters said path;*

*placing a pipe having two ends along an underground inverted arcuate path, until said pipe completely occupies said path;*

*thereafter attaching reaming apparatus to one end of said pipe;*

*attaching one end of said casing to said reaming apparatus in following relationship to said reaming apparatus; and*

*drawing said pipe along said path without rotating said casing, whereby said reaming apparatus and said casing are drawn along said path.*

* * * * *